United States Patent
Lee et al.

(10) Patent No.: US 10,337,575 B2
(45) Date of Patent: *Jul. 2, 2019

(54) BALL SCREW TYPE ELECTROMECHANICAL BRAKE

(71) Applicant: Hyundai Motor Company, Seoul (KR)

(72) Inventors: Joung Hee Lee, Suwon-si (KR); Jong Yun Jeong, Hwaseong-si (KR); Dong Yoon Hyun, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,943

(22) Filed: Apr. 20, 2017

(65) Prior Publication Data

US 2018/0149221 A1 May 31, 2018

(30) Foreign Application Priority Data

Nov. 29, 2016 (KR) .......................... 10-2016-0160575

(51) Int. Cl.
| | | |
|---|---|---|
| *F16D 65/66* | (2006.01) | |
| *F16D 65/18* | (2006.01) | |
| *F16D 121/24* | (2012.01) | |
| *F16D 125/36* | (2012.01) | |
| *F16D 125/40* | (2012.01) | |

(52) U.S. Cl.
CPC .............. *F16D 65/66* (2013.01); *F16D 65/18* (2013.01); *F16D 65/183* (2013.01); *F16D 2121/24* (2013.01); *F16D 2125/36* (2013.01); *F16D 2125/40* (2013.01)

(58) Field of Classification Search
CPC ...... F16D 65/66; F16D 65/18; F16D 2121/24; F16D 2125/36; F16D 2125/40; F16D 55/30; F16D 2125/20; F16D 2125/50
See application file for complete search history.

(56) References Cited

U.S. PATENT DOCUMENTS

| | | | |
|---|---|---|---|
| 4,850,457 A * | 7/1989 | Taig ...................... | B60T 13/741 188/156 |
| 4,860,859 A | 8/1989 | Yamatoh et al. | |
| 5,107,967 A | 4/1992 | Fujita et al. | |
| 6,158,557 A | 12/2000 | Leitermann et al. | |
| 7,004,290 B2 | 2/2006 | Ohtsuki et al. | |
| 8,616,348 B2 | 12/2013 | Winkler et al. | |
| 8,671,789 B2 | 3/2014 | Osterlaenger et al. | |
| 9,340,194 B2 | 5/2016 | Giering | |
| 2003/0050147 A1* | 3/2003 | Backes ................... | F16D 65/18 475/343 |

(Continued)

FOREIGN PATENT DOCUMENTS

WO    WO 2015/081191 A1    6/2015

*Primary Examiner* — Xuan Lan Nguyen
(74) *Attorney, Agent, or Firm* — Morgan, Lewis & Bockius LLP

(57) ABSTRACT

An electromechanical brake may include a drive device for the electromechanical brake to which a non-circulation type ball screw is applied, and may automatically compensate for a position movement amount of a ball caused by pad abrasion, wherein the electromechanical brake includes a drive device, that is, an electromechanical brake with a non-circulation type ball screw, in which pad abrasion is compensated by the ball screw, a torsion spring, and a ball retainer mounted at the other side of the torsion spring.

12 Claims, 9 Drawing Sheets

(56) References Cited

U.S. PATENT DOCUMENTS

| | | | | |
|---|---|---|---|---|
| 2003/0051569 A1* | 3/2003 | Kapaan | ............... | F16D 65/18 74/424.85 |
| 2003/0102192 A1* | 6/2003 | Kapaan | ............... | F16D 65/18 188/72.7 |
| 2009/0283371 A1* | 11/2009 | Winkler | ............... | F16D 65/18 188/72.6 |
| 2010/0320042 A1* | 12/2010 | Giering | ............ | B60T 13/741 188/162 |
| 2011/0011191 A1* | 1/2011 | Osterlaenger | ......... | F16C 19/30 74/89.23 |
| 2011/0162935 A1* | 7/2011 | Winkler | ............ | F16H 25/2238 192/219.4 |
| 2012/0018262 A1* | 1/2012 | Winkler | ............... | F16D 65/18 188/106 F |
| 2012/0085139 A1 | 4/2012 | Osterlanger et al. | | |
| 2012/0090418 A1* | 4/2012 | Barthlein | ............ | F16D 65/18 74/424.81 |
| 2015/0136543 A1* | 5/2015 | Selles | ................ | B64C 25/44 188/162 |
| 2015/0330487 A1* | 11/2015 | Wilhelm | .......... | F16H 25/2233 188/72.8 |
| 2015/0362051 A1* | 12/2015 | Adler | .............. | F16H 25/2233 74/424.81 |
| 2016/0033018 A1 | 2/2016 | Tashiro | | |
| 2016/0033019 A1* | 2/2016 | Aramoto | ............. | F16D 65/18 74/424.81 |
| 2016/0186825 A1* | 6/2016 | Winkler | ............. | B60T 13/741 188/106 F |
| 2018/0163803 A1* | 6/2018 | Lee | ................... | F16D 55/226 |

* cited by examiner

BALL SCREW TYPE ELECTROMECHANICAL BRAKE

CROSS REFERENCE TO RELATED APPLICATION

The presnt application claims priority to Korean Patent Application No. 10-2016-0160575 filed on Nov. 29, 2016, the entire contents of which are incorporated herein for all purposes by reference.

BACKGROUND OF THE INVENTION

Field of the Invention

The present invention relates to an electromechanical brake, and more particularly, to an electromechanical brake which adopts a ball screw.

Description of Related Art

In general, a brake device for a vehicle is a device that generates braking force for decelerating or stopping a traveling vehicle or maintaining the vehicle in a stopped state, and the braking is carried out while kinetic energy of the vehicle is converted into thermal energy by mechanical friction when the vehicle decelerates and frictional heat is radiated into the atmosphere.

As the brake device for a vehicle, there are a drum type hydraulic brake, a disc type hydraulic brake, and the like, and the disc type hydraulic brake obtains braking force by pressing friction pads against both surfaces of a disc, which rotates together with a wheel, instead of using a drum.

However, the hydraulic brake has a complicated structure because the hydraulic brake requires mechanical elements connected to a brake pedal at a driver seat, hydraulic piping, elements for controlling hydraulic pressure, and the like, and therefore, an electromechanical brake (EMB) has been developed and used to simplify a configuration of the brake device.

Unlike the typical hydraulic brake, the electromechanical brake refers to a brake that obtains braking force by pressing a friction pad by using a mechanical mechanism driven by an electric motor.

The typical electromechanical brake has an actuator including the electric motor that rotates forward and backward to perform the braking operation (press the friction pad) and release the braking operation (reduce pressure), and the electromechanical brake is configured to operate to press the friction pad using rotational force of the motor, wherein the friction pad presses the disc (causes friction with the disc) at a time of performing the braking operation.

Compared with the hydraulic brake, the electromechanical brake has a simple structure and a high response speed and may be more precisely controlled, improving braking safety.

The electromechanical brake is advantageous because braking force is controlled, and used to implement a brake-by-wire (BBW) system.

The electromechanical brake generates braking force from electric power by using the motor and a mechanical transmission mechanism as described above, and in the instant case, most electromechanical brakes use a principle of a screw-nut structure, and convert rotational force of the motor into rectilinear force for pressing the friction pad.

In the screw-nut structure, there may be applied a ball screw in which balls are interposed between a nut and a screw, wherein force is transmitted through the balls to reduce frictional resistance.

The ball screw is classified into a circulation type ball screw in which the balls circulate, and a non-circulation type ball screw in which the balls do not circulate. The circulation type ball screw may be applied to the case in which an operation section is long and continuous, and the non-circulation type ball screw may be restrictively used in the case in which an operation section is short and discontinuous even though the non-circulation type ball screw is advantageous in terms of packaging because an external diameter of the nut may be decreased. Meanwhile, because a movement amount of a piston in the electromechanical brake is not large, the non-circulation type ball screw may be applied to the electromechanical brake. However, in the electromechanical brake, the balls are configured to be gradually moved because of pad abrasion, and as a result, there is a need for a technology of restoring positions of the balls.

The information disclosed in this Background of the Invention section is for enhancement of understanding of the general background of the invention and not is taken as an acknowledgement or a form of suggestion that this information forms the related art already known to a person skilled in the art.

BRIEF SUMMARY

Various aspects of the present invention are directed to providing an electromechanical brake, which has a drive device for the electromechanical brake to which a non-circulation type ball screw is applied, and may automatically compensate for a position movement amount of a ball caused by pad abrasion.

Various aspects of the present invention are directed to providing an electromechanical brake including: a piston which presses a friction pad; and a drive device which provides power for moving the piston, in which the drive device includes a nut member which is coupled to the piston and configured to transmit axial movement power to the piston, a screw which is coupled to the nut member and rotates to move the nut member in an axial direction, balls which are inserted between the nut member and the screw and transmits rotational force of the screw to the nut member, a torsion spring having a first side which is mounted to the nut member, and a ball retainer which is mounted at a second side of the torsion spring, and the ball retainer is disposed to be adjacent to a ball at a rearmost end portion among the balls inserted between the nut member and the screw, and configured to contact with the balls and press the torsion spring when braking pressurization is carried out.

In an exemplary embodiment, a head portion, which is formed to press an internal end portion of the piston, may be formed at a first end portion of the nut member, and a support groove for accommodating the ball retainer and the torsion spring may be formed at a second end portion of the nut member.

In another exemplary embodiment, a support end portion for preventing the ball retainer from moving toward the ball may be formed in the support groove.

In still another exemplary embodiment, the torsion spring may be disposed on the support end portion to be restricted in a compressed state to have initial mounting force.

In yet another exemplary embodiment, the ball retainer may be disposed to have a gap with the ball before the braking pressurization is carried out.

In still yet another exemplary embodiment, the ball retainer may form a gap with the ball even after the braking operation is released.

In a further exemplary embodiment, at least one retainer groove may be formed in an internal surface of the ball retainer to accommodate the balls.

In another further exemplary embodiment, at least one disconnection portion may be formed in the ball retainer, wherein the retainer groove is not formed over an entire internal surface of the ball retainer.

In still another exemplary embodiment, a concave and curved shape may be formed as a depth of the groove is increased at an end portion of the retainer groove based on the disconnection portion.

In another further exemplary embodiment, the nut member may have a guide groove in which the plurality of balls are configured to be moved, and an internal diameter of the retainer groove may be equal to an internal diameter of the guide groove.

In another exemplary embodiment, at least one protrusion portion may be formed on the ball retainer to prevent the balls from moving rearwards.

In a still further exemplary embodiment, the protrusion portion may have a curved shape of which the protruding height is decreased leftwards and rightwards from a center of the protrusion portion, and the protrusion portion may have a predetermined area which is configured to be increased from an internal surface of the ball retainer to an external surface of the ball retainer, wherein the protrusion portion has a sidewall having a concave and curved shape.

According to an exemplary embodiment of the present invention, an electromechanical brake, which is configured to be operated in a ball screw type, may be implemented, and as a result, it is possible to improve operational efficiency by reducing frictional resistance, and improve durability of the drive device.

According to the exemplary embodiment of the present invention, since the non-circulation type ball screw may be applied, it is possible to reduce a size, and it is advantageous in respect to packaging.

It is also possible to automatically compensate for a movement of the balls caused by pad abrasion, and as a result, it is possible to continuously use the electromechanical brake without separately compensating for pad abrasion.

Other aspects and exemplary embodiments of the invention are discussed infra. It is understood that the term "vehicle" or "vehicular" or other similar term as used herein is inclusive of motor vehicles in general such as passenger automobiles including sports utility vehicles (SUV), buses, the trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuel derived from resources except petroleum). As referred to herein, a hybrid vehicle is a vehicle that has at least two sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A, FIG. 5B, FIG. 5C, and FIG. 5D are views illustrating movements of a screw and the nut, in which FIG. 5A illustrates a state before balls and the ball retainer contact with each other, FIG. 5B illustrates a state while braking pressurization is carried out, FIG. 5C illustrates a state in which pad abrasion occurs due to the continuous braking pressurization, and FIG. 5D illustrates a state after a braking operation is carried out;

FIG. 6A, FIG. 6B, FIG. 6C, and FIG. 6D are views illustrating a movement of the balls with respect to the ball retainer, in which FIG. 6A illustrates a state before the balls and the ball retainer contact with each other, FIG. 6B illustrates a state while the braking pressurization is carried out, FIG. 6C illustrates a state in which pad abrasion occurs due to the continuous braking pressurization, and FIG. 6D illustrates a state after the braking operation is carried out;

FIG. 7A, FIG. 7B, FIG. 7C, FIG. 7D, FIG. 7E, FIG. 7E, and FIG. 7F are views illustrating the state in which the positions of the balls are regulated by compensating for the pad abrasion by the ball retainer, in which FIG. 7A illustrates a state before the balls and the ball retainer contact with each other, FIGS. 7B and 7C illustrate states while the braking pressurization is carried out, FIG. 7D illustrates a state while a spring is extended when the braking is released, FIG. 7E illustrates a state in which the abrasion is compensated while the braking is released, and FIG. 7F illustrates a state in which the braking is completely released and the balls return to an original position thereof;

Figure 1:
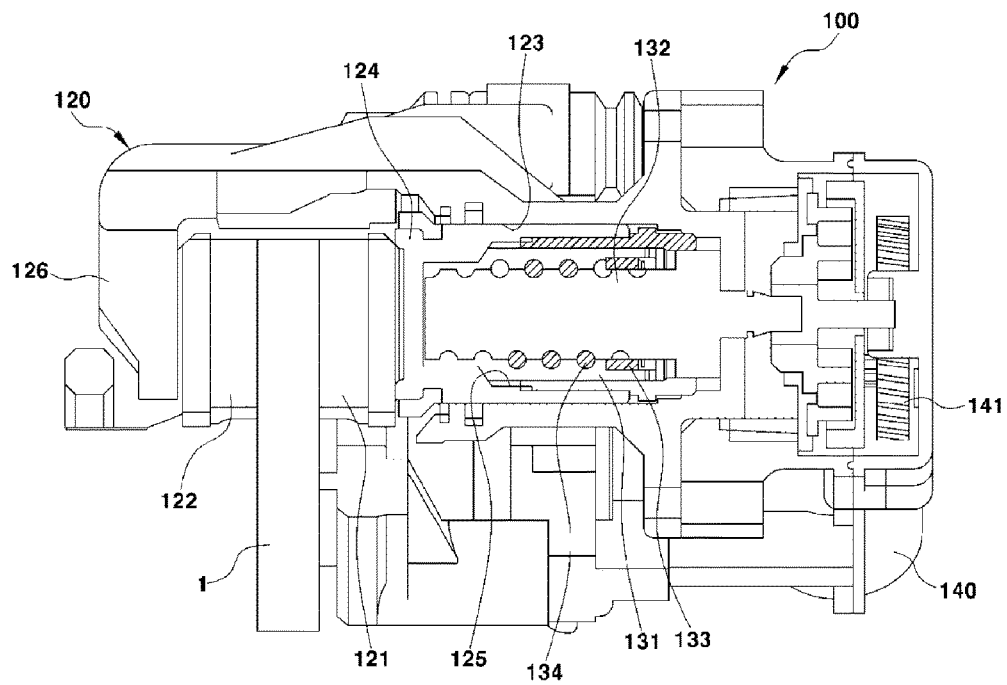
FIG. 1 is a cross-sectional view of an electromechanical brake according to an exemplary embodiment of the present invention.

It is understood that the appended drawings are not necessarily to scale, presenting a somewhat simplified representation of various features illustrative of the basic principles of the invention. The predetermined design features of the present invention as disclosed herein, including: for example, predetermined dimensions, orientations, locations, and shapes will be determined in part by the particular intended application and use environment.

In the figures, reference numbers refer to the equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments but also various alternatives, modifications, equivalents and other embodiments, which may be included within the spirit and scope of the invention as defined by the appended claims.

An electromechanical brake according to an exemplary embodiment of the present invention is characterized in that a non-circulation type ball screw is applied to a drive device which transmits driving power of a motor to apply clamping force of a caliper housing when the motor is configured to operate to generate braking force. The electromechanical brake according to the exemplary embodiment of the present invention is also characterized in that when the non-circulation type ball screw is applied to the drive device, a ball retainer is provided at a first end portion of a nut to compensate for ball position displacement caused by pad abrasion. The ball retainer is disposed together with an elastic member disposed in a pad abrasion direction, and configured to compensate for the pad abrasion by using restoring force of the elastic member.

Hereinafter, a ball screw type electromechanical brake according to the exemplary embodiment of the present invention will be described in detail with reference to the accompanying drawings.

Figure 2:
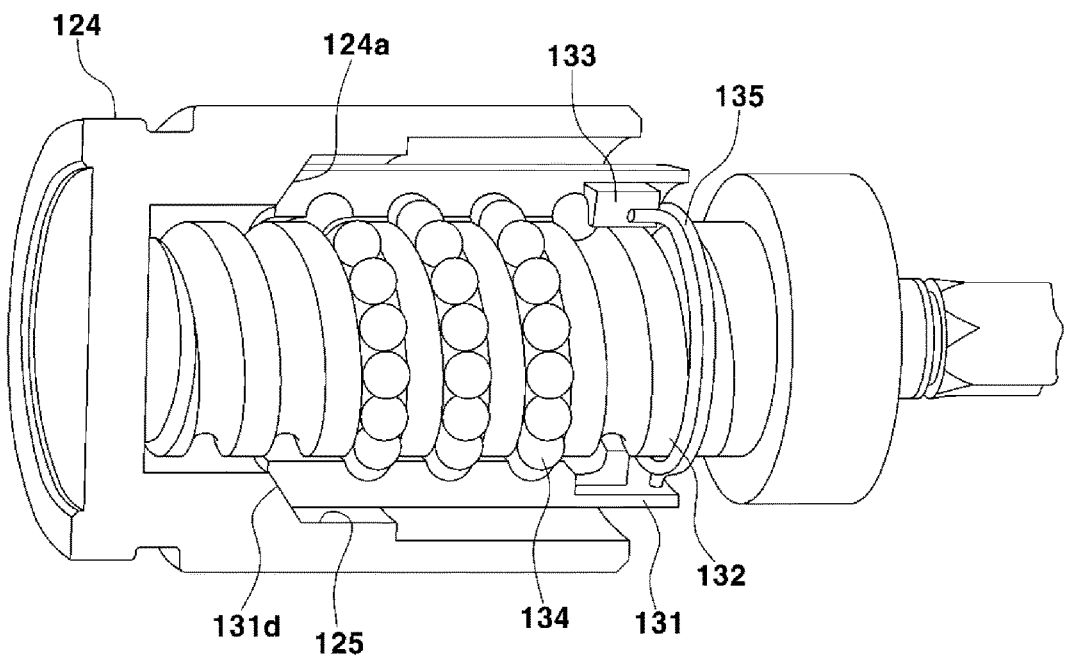
FIG. 2 is a cross-sectional perspective view illustrating the main operating device of the electromechanical brake according to the exemplary embodiment of the present invention.
Figure 3:
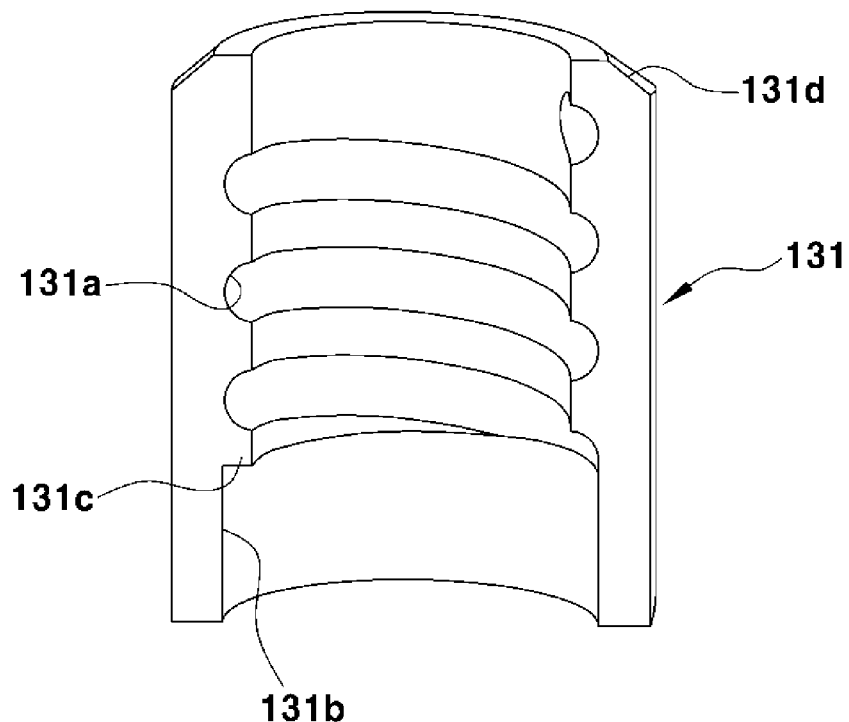
FIG. 3 is a cross-sectional perspective view of a nut of the main operating device illustrated in FIG. 2.
Figure 4:
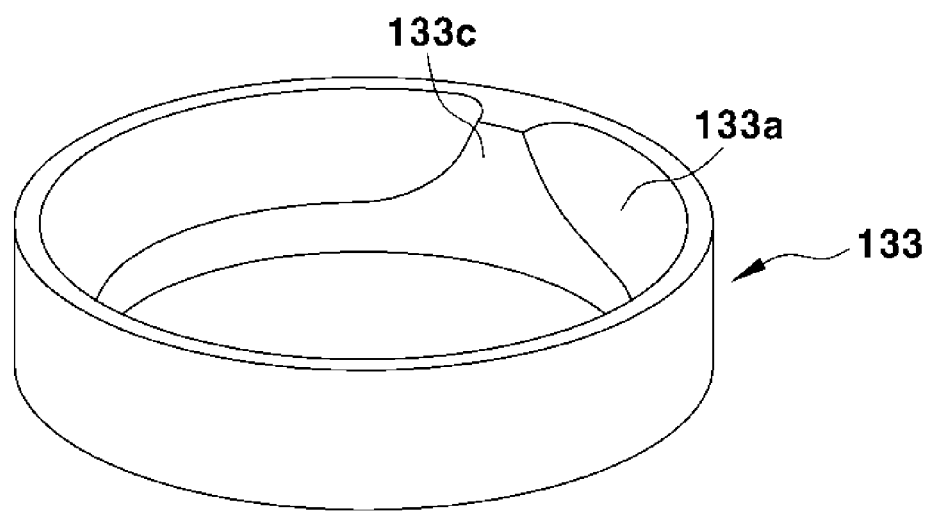
FIG. 4 is a perspective view illustrating a ball retainer of the main operating device illustrated in FIG. 2.

FIG. 1 is a cross-sectional view of an electromechanical brake according to an exemplary embodiment of the present invention, and FIG. 2 is a cross-sectional perspective view illustrating the main operating device of the electromechanical brake according to the exemplary embodiment of the present invention. Further, FIG. 3 is a cross-sectional perspective view of a nut member of the main operating device illustrated in FIG. 2, and FIG. 4 is a view illustrating a ball retainer of the main operating device illustrated in FIG. 2.

As illustrated in FIG. 1, an electromechanical brake 100 according to an exemplary embodiment of the present invention includes a carrier which is fixedly disposed on a vehicle body, and a caliper housing 120 which is coupled to the carrier to be movable forward and backward, and the carrier and the caliper housing 120 are disposed to surround a first side of a disc 1 disposed in a wheel of a vehicle.

In the carrier, a pair of friction pads (brake pads) 121 and 122, which presses both surfaces of the disc 1 that rotates together with the wheel of the vehicle, is disposed to be movable forward and backward thereof.

The pair of friction pads 121 and 122 are disposed to be spaced apart from each other, and the disc 1 is disposed between the pair of friction pads 121 and 122. Therefore, when a piston 124 to be described below is configured to operate to move forward, the friction pad 121 is configured to move toward the disc 1 to cause friction with the disc and press the disc, performing the braking operation.

The caliper housing 120 is slidably disposed on the carrier and has a cylinder 123 in which the piston 124 is disposed.

That is, the hollow cylinder 123 is formed at a first side of the caliper housing 120, and the piston 124 is disposed in the cylinder 123 to be movable forward and backward thereof.

The piston 124 is configured to move forward to move one friction pad 121 of the pair of friction pads 121 and 122 forward toward the disc 1, wherein the friction pad 121 causes friction with the disc 1.

A finger portion 126, which is configured to move a second friction pad 122 forward toward the disc 1 where the second friction pad 122 causes friction with the disc 1, is formed at a second side of the caliper housing 120.

Therefore, the piston 124 is configured to move forward toward the friction pad 121 and the disc 1 by force transmitted for braking and resultantly, presses the first friction pad 121 against the disc 1, and the caliper housing 120 is configured to move in a direction opposite to a movement direction of the piston 124 by reaction force applied between the piston 124 and the first friction pad 121, wherein the finger portion 126 of the caliper housing 120 presses a second friction pad 122 against the disc 1.

Therefore, the two friction pads 121 and 122 are pressed against both surfaces of the disc 1 at the same time.

In the present case, the braking operation is performed by frictional force generated between the two friction pads 121 and 122 and the disc 1, and the frictional force generates braking force to restrict the wheel, wherein the wheel cannot be rotated.

Here, force, with which the piston 124 and the finger portion 126 of the caliper housing 120 press the friction pads 121 and 122 against both surfaces of the disc 1, may be referred to as clamping force of the caliper housing 120, and at a time of performing the braking operation (i.e., pressing the friction pads), reaction force, which is generated when the clamping force is applied, is applied to the piston 124 from the friction pad 121.

Meanwhile, the electromechanical brake 100 according to the exemplary embodiment of the present invention includes a drive device for operating the piston 124. The drive device includes a nut member 131 which is coupled to the piston 124 disposed in the cylinder 123 of the caliper housing 120 and is configured to move forward and backward in an axial direction (is configured to move straight forward and backward) to allow the piston 124 to move forward and backward, and a screw 132 which is coupled to the nut member 131 and rotates to allow the nut member 131 to move forward and backward (move straight forward and backward). In addition, in the present exemplary embodiment, the drive device is understood as further including an electric motor 140 which provides rotational force for generating braking force, and a gear assembly 141 which is disposed between a rotation shaft of the electric motor 140 and the screw 132 and transmits rotational force of the electric motor 140 to the screw 132.

The electric motor 140 of the drive device is a driving source which generates driving power, that is, rotational force for performing the braking operation (pressing) and releasing the braking operation (reducing pressure), and rotates forward at a time of pressing the friction pad and rotates backward at a time of reducing pressure on the friction pad, wherein the electric motor 140 generates forward rotational force and backward rotational force and provides the forward rotational force and the backward rotational force to the screw 132 through the gear assembly 141.

The operation of the electric motor 140 is configured to be controlled by a controller, and the controller is configured to control the forward and backward operations of the motor 140.

The screw 132 is coupled to a shaft of an output gear 142 of the gear assembly 141, and the gear assembly 141 is a constituent element that reduces a rotation speed of the motor 140, amplifies rotational force of the motor 140, and resultantly, transmits the rotational force to the screw 132, and the gear assembly 141 may be configured as a gear train including a combination of gears.

An electric motor and a gear assembly, which have been applied to a publicly known electromechanical brake 100, are configured to be applied as the electric motor 140 and the gear assembly 141.

Meanwhile, in the present exemplary embodiment, the drive device is of a ball-screw type that converts rotational motion of the screw into translational motion of the piston by balls 134 inserted between the screw 132 and the nut member 131.

First, the piston 124 of the caliper housing 120 has therein a hollow portion 125 that extends and elongates in an axial direction thereof (i.e., an axial direction is identical to the forward and backward movement direction of the piston), and the nut member 131 is disposed and coupled in the hollow portion 125 of the piston 124.

As illustrated in FIG. 3, the nut member 131 has a long cylindrical shape, and has a head portion 131*d* which is formed at a tip portion of the nut member 131 and configured to contact with an internal end portion 124*a* of the hollow portion 125 of the piston 124 to press the internal end portion 124*a* of the hollow portion 125.

A spiral guide groove 131*a* is formed in an internal surface of the nut member 131 along a circumference of the internal surface. The guide groove 131*a* is configured to guide a movement of the balls between the screw and the nut member 131, and the guide groove 131*a* has a length by which a movement of the balls is configured to be controlled in consideration of a number of balls included in the ball screw.

The nut member 131 is assembled to surround an external circumference of the screw, and the nut member 131 is configured to move along an external surface of the screw by the plurality of balls inserted between the external surface of the screw and the internal surface of the nut member 131. That is, when the screw rotates in accordance with the operation of the electric motor, the nut member and the piston 124 connected to the nut member are rectilinearly configured to be moved by the balls.

To this end, a guide groove, which corresponds to the guide groove 131*a* of the nut member 131, is also formed in the screw, and the plurality of balls is disposed between the guide grooves.

Meanwhile, in the present exemplary embodiment, a cylindrical support groove 131*b*, which accommodates a ball retainer 133 and supports the ball retainer 133, is formed at a second end portion of the nut member 131, that is, at an end portion opposite to a first end portion at which the head portion 131*d* is formed. As illustrated in FIG. 2, the ball retainer 133 and a spring member 135 for elastically supporting the ball retainer 133 are inserted into the support groove 131*b*, and a support end portion 131*c* for restricting the ball retainer 133 is formed at a first end portion of the support groove 131*b*.

As illustrated in FIG. 2 and FIG. 3, the ball retainer 133 has a ring shape to be inserted along an external circumference of the screw. The ball retainer 133 is elastically supported by the spring 135, a first end portion of the spring member 135 is fixed to the nut member, and a second end portion of the spring member 135 is fixed to the ball retainer 133. In the present exemplary embodiment, the spring member 135 is a torsion spring, and the spring member 135 is configured to be twisted and compressed when an external force is applied to the spring 135.

As illustrated in FIG. 2, the ball retainer 133 is basically mounted on the nut member by the spring 135, and as a result, the ball retainer and the nut member move together. However, in the case in which the ball retainer 133 and the nut move relative to each other, the spring member 135 is compressed and provides restoring force with respect to the balls. Therefore, the spring member 135 is a constituent element for restoring the positions of the balls when the braking operation is released.

A retainer groove 133*a* is formed in the ball retainer 133 to support the balls and transmit force applied by the balls. The retainer groove 133*a* is formed in a side surface where the retainer faces the balls, and the retainer groove 133*a* is not formed over an entire internal surface of the retainer, but has at least one disconnection portion 133*c*. The disconnection portion 133*c* refers to the internal surface of the retainer in which no groove is formed, and the disconnection portion 133*c* is configured to guide the balls, wherein the balls may be seated in the retainer groove 133*a*, and to transmit force, by which the balls press the ball retainer 133, to the spring 135. Therefore, the disconnection portion 133*c* of the retainer groove is formed in a shape as illustrated in FIG. 4, and based on the disconnection portion 133*c*, a shape of an end portion of the retainer groove 133*a* has a concave and curved shape as a depth of the groove is increased. Therefore, with the concave and curved shape at the end portion of the retainer groove 133*a*, the balls may roll and move on a surface of the retainer groove. For example, when the balls press the ball retainer 133, the spring member 135 is compressed, and the ball retainer 133 is configured to be moved rearwards (in a right direction in FIG. 2).

FIG. 4 illustrates that two retainer grooves are provided as a second disconnection portion is included at a portion opposite to one disconnection portion 133*c* illustrated in front, but a number of retainer grooves is not limited thereto, and it is also conceivable that a single groove or at least two grooves may be provided.

Meanwhile, a position of the disconnection portion 133*c* in the retainer groove needs to be initially set to correspond to a position of a ball at a rearmost side of the ball screw. The reason is to enable the balls to compress the spring member 135 without delay while moving to an exact position in the retainer groove 133*a*.

The retainer groove is configured to be configured to for a predetermined time accommodate the balls of the ball screw, and an internal diameter of the retainer groove is set to correspond to an internal diameter of the guide groove 131*a* of the nut member.

As described below, the inserted balls are set to be maintained in a non-contact state with the ball retainer 133 in the initial state. Therefore, the nut translational motion is carried out by the rotation of the screw in the non-contact state between the ball retainer 133 and the ball at the rearmost end portion of the ball screw, and as a result, the nut member 131 may be configured to be moved while the balls are maintained in the non-contact state, improving efficiency of the drive device. In addition, as illustrated in FIG. 2 and FIG. 3, a support end portion 131*c* is formed at a first end portion of the support groove 131*b*, and the spring member 135 may be compressed and supported by the support end portion 131c to have initial mounting force (required to allow the spring to be in a compressed initial state). When the initial mounting force is imparted to the spring member 135 as described above, the non-contact state between the ball and the ball retainer 133 may be maintained by the initial mounting force even though the braking operation is released.

FIG. 5A, FIG. 5B, FIG. 5C, and FIG. 5D illustrate the movements of the screw and the nut, and FIG. 6A, FIG. 6B, FIG. 6C, and FIG. 6D illustrate the movements of the balls with respect to the ball retainer 133 in situations corresponding to the situations in FIG. 5A, FIG. 5B, FIG. 5C, and FIG. 5D.

Figure 5A:
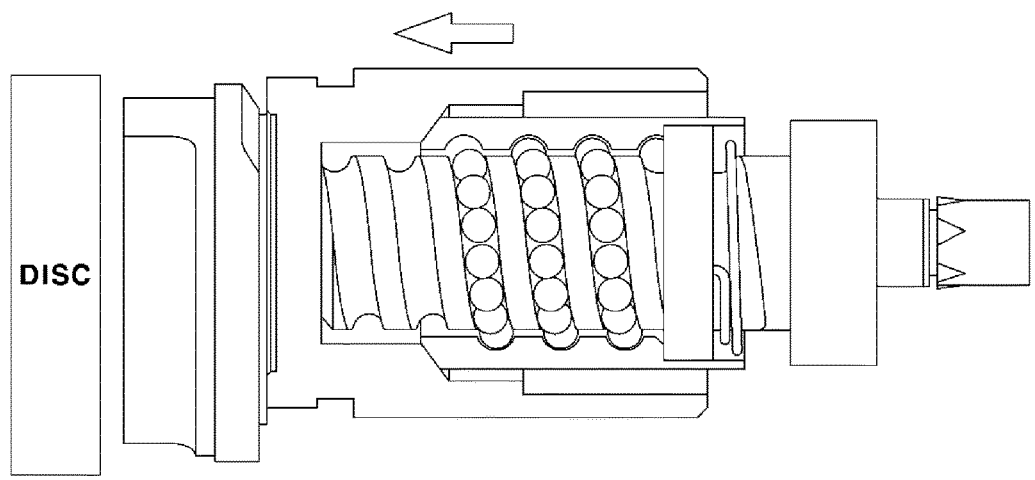
Figure 6A:
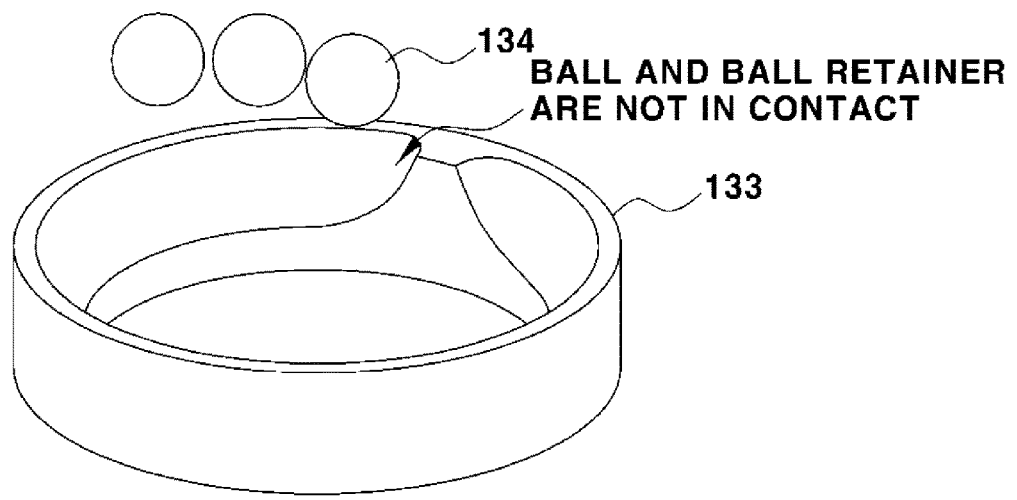

In the present exemplary embodiment, since the initial setting is set to prevent the ball and the ball retainer 133 from contacting each other, the ball and the ball retainer 133 do not contact with each other at a point in time at which the ball screw begins to operate, as illustrated in FIG. 6A. In the instant case, as illustrated in FIG. 5A, the disc and the friction pad are in a non-contact state, and the nut member 131 begins to move forward thereof.

Figure 5B:
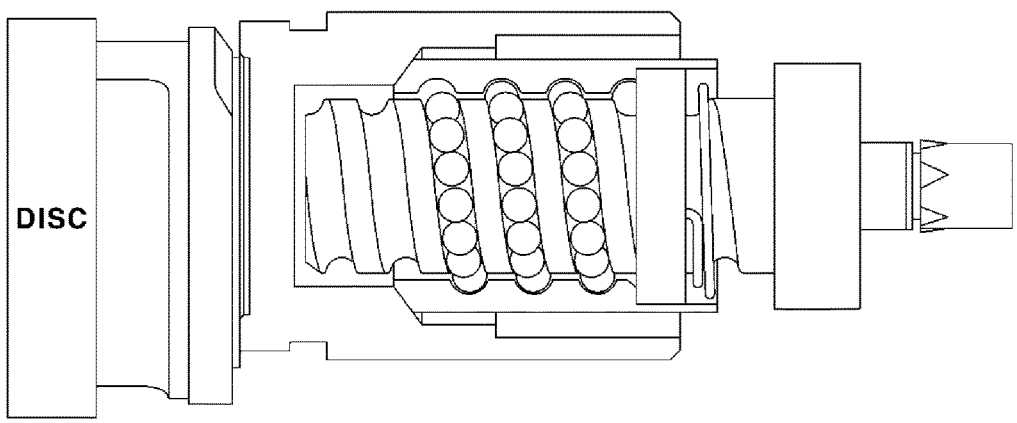
Figure 6B:
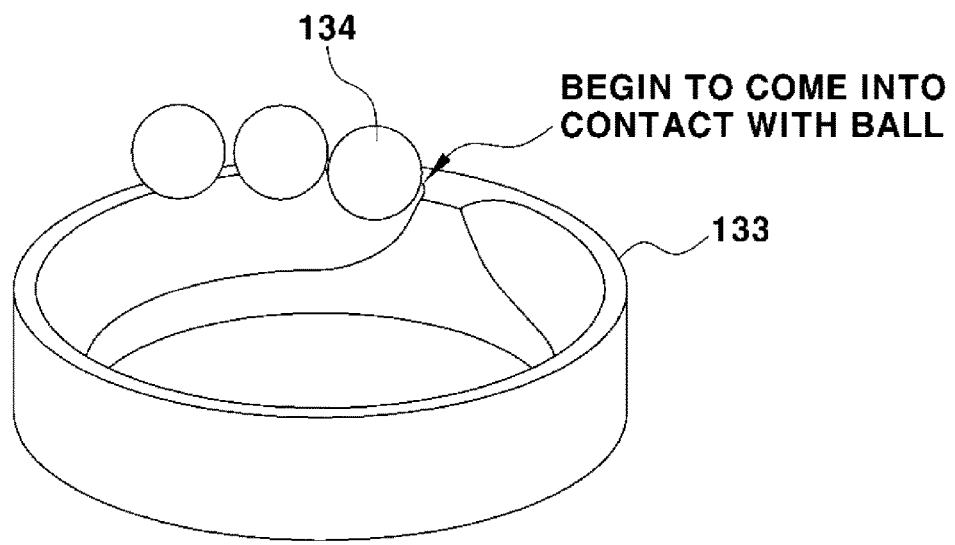
Figure 6C:
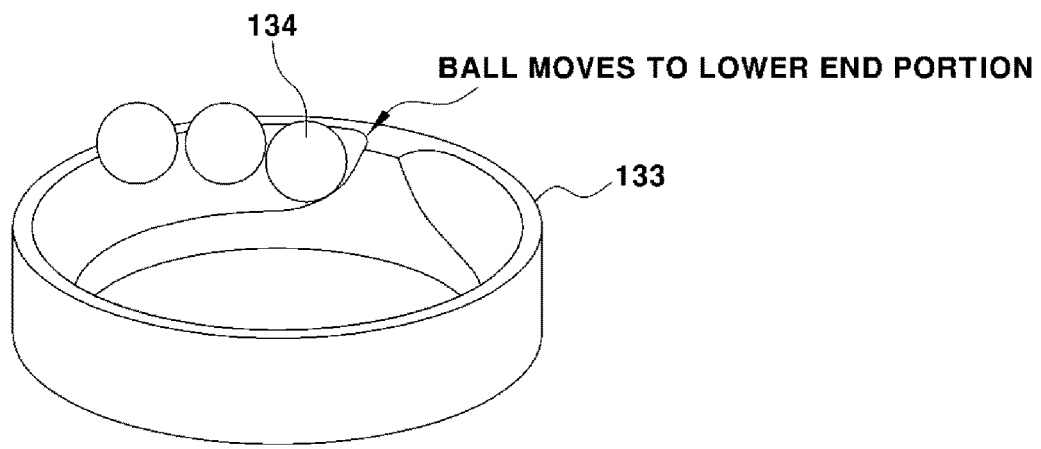
Figure 6D:
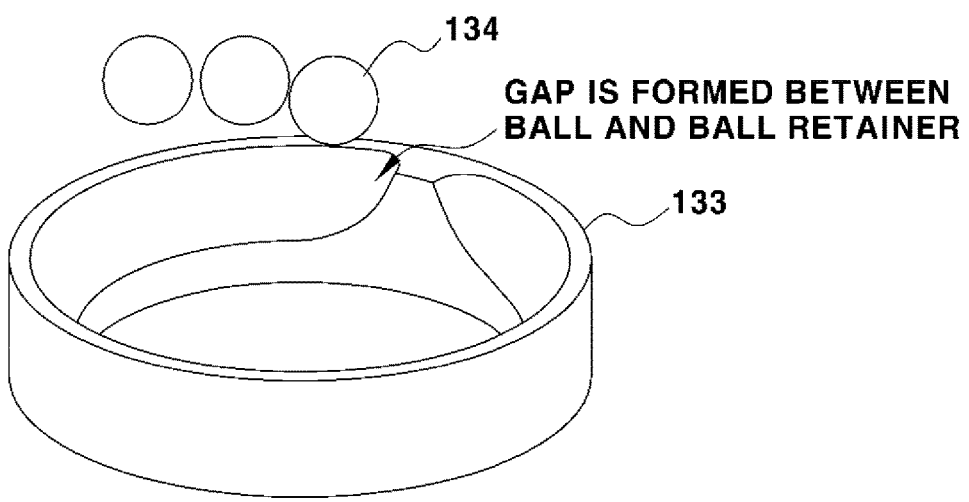

FIG. 5B is a view illustrating a state while braking pressurization is carried out, and during the braking pressurization, the disc and the friction pad contact with each other, performing the braking operation. As illustrated in FIG. 6B, during the braking pressurization, the balls are configured to be moved rearwards by braking reaction force, and begin to contact with the ball retainer 133.

Figure 5C:
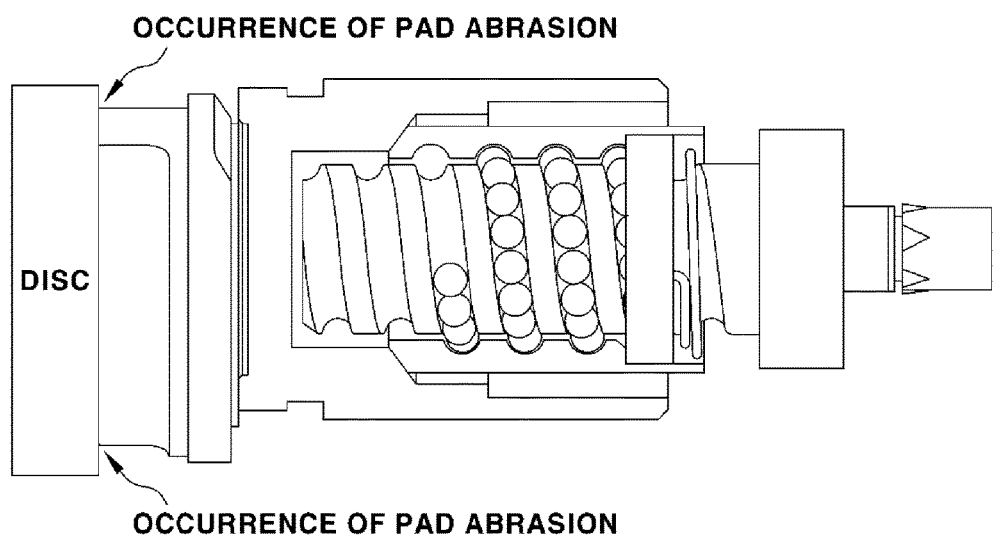

FIG. 5C illustrates a state in which pad abrasion occurs due to the continuous braking pressurization, and in the instant case, as illustrated in FIG. 5C, the balls move completely to the retainer groove 133a of the ball retainer 133 while moving rearwards, and compress the spring while pressing the disconnection portion 133c of the ball retainer 133

Figure 5D:
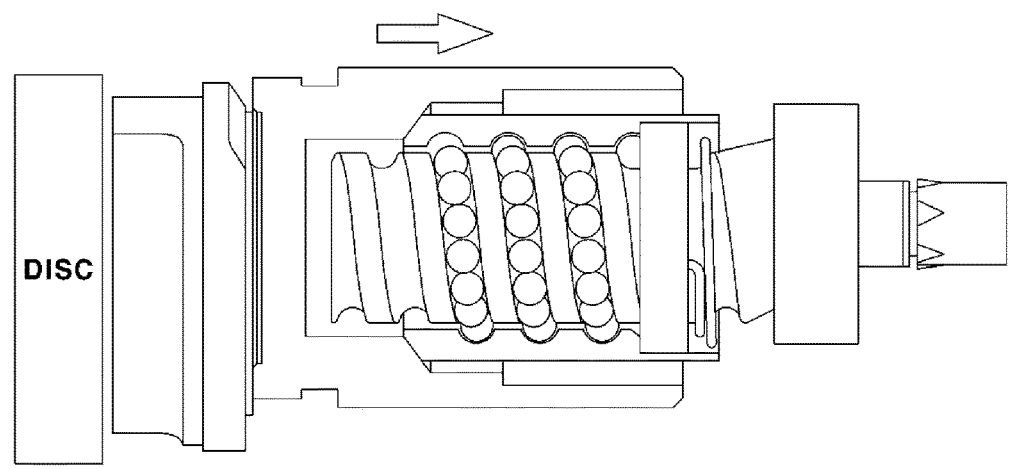

Thereafter, when the braking operation end portions, the nut member 131 and the piston 124 are configured to be moved rearwards by the rotation of the screw. FIG. 5D is a view illustrating a state after the braking operation is carried out, and in the present exemplary embodiment, the piston 124 and the nut move forward by an amount of abrasion of the friction pad by the restoring force of the spring member 135 after the braking operation is carried out.

An operating mechanism of the ball screw according to the present exemplary embodiment is described in more detail with reference to FIGS. 7A to 7F.

Figure 7A:
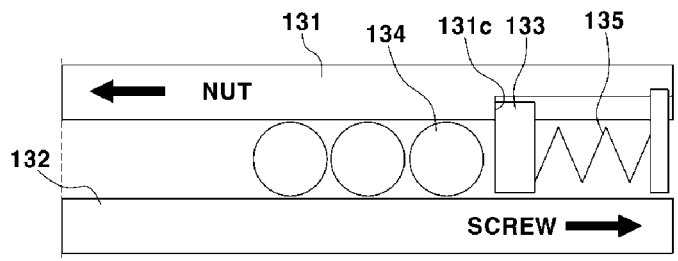

First, FIG. 7A illustrates a state before the ball and the ball retainer 133 contact with each other, and illustrates the same state as FIGS. 5A and 6A. The balls are not in contact with each other, and there is no sliding resistance between the balls.

Figure 7B:
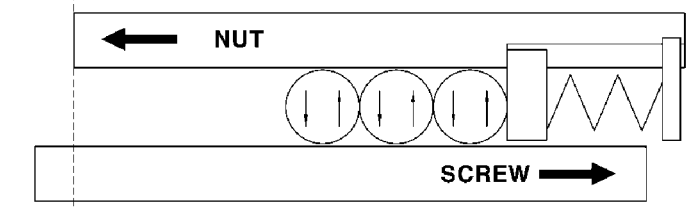
Figure 7C:
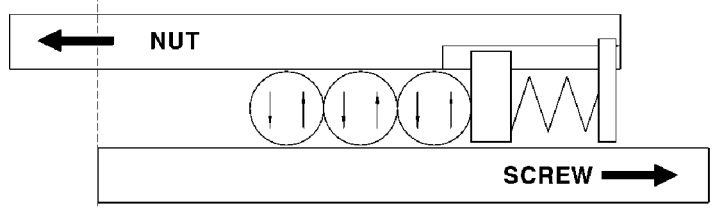

Thereafter, when the friction pad and the disc contact with each other and the braking pressurization is carried out, frictional force is generated in the relationship between the balls and the nut and the screw, and the balls and the nut are configured to be moved relative to each other, as illustrated in FIG. 7B. Thereafter, as illustrated in FIG. 7C, gaps between the balls and the ball retainer 133 disappear, and the spring member 135 begins to be compressed.

Figure 7D:
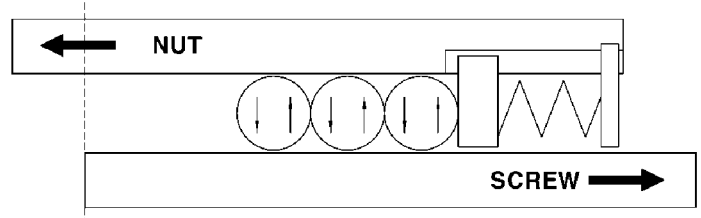

Meanwhile, when the braking operation is released, frictional force of the balls is greater than restoring force of the spring at the initial time, and as a result, the spring is extended by a distance by which the balls are configured to be moved as the balls are configured to be moved, as illustrated in FIG. 7D.

Figure 7E:
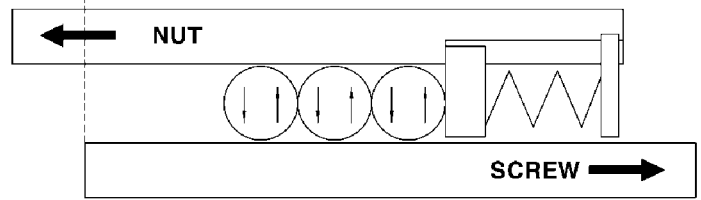
Figure 7F:
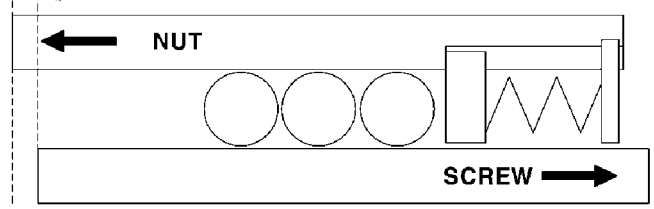
Figure 8A:
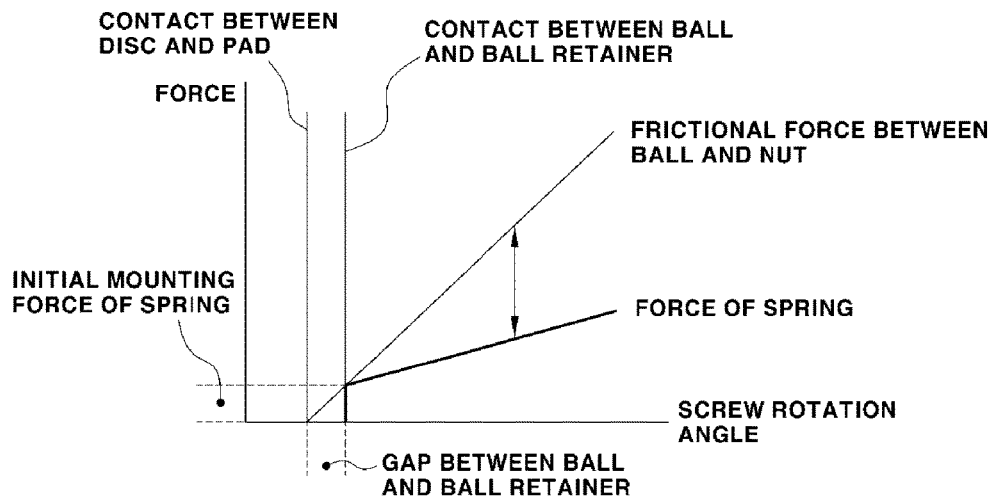
FIG. 8A is a view illustrating ball-nut frictional force and force of a spring with respect to screw rotation angles before the braking operation is carried out.
Figure 8B:
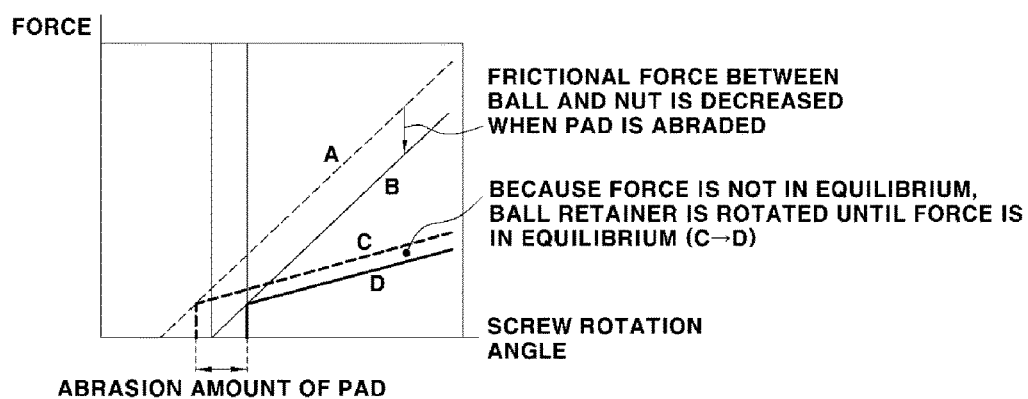
FIG. 8B is a view illustrating a change in frictional force of the balls and a change in force of the spring in a state in which a friction pad is abraded.

In contrast, as illustrated in FIG. 8B, frictional force between the balls and the nut is configured to be reduced when the friction pad is abraded, the braking operation is released due to the reduction in frictional force, and as a result, frictional force of the balls are configured to be smaller than restoring force of the spring. This state is illustrated in FIG. 7E, and since the restoring force of the spring is greater than frictional force of the balls, the abrasion is compensated as the ball retainer 133 pushes the balls while the spring is extended. Therefore, in the present exemplary embodiment, the abrasion amount of the friction pad may be compensated by restoring force of the spring member 135 mounted in the ball retainer 133.

In this regard, FIG. 8A is a view illustrating ball-nut frictional force and force of the spring member with respect to screw rotation angles before the braking operation is carried out, and FIG. 8B a view illustrating a change in frictional force of the balls and a change in force of the spring member in a state in which the friction pad is abraded. FIGS. 8A and 8B illustrate examples in which the initial mounting force is set to the spring member 135, and in these examples, the nut member 131 may be additionally configured to be moved at a point in time at which the support end portion 131c of the nut member 131 begins to restrict a movement of the ball retainer 133 (i.e., a point before complete equilibrium of force is made by the initial mounting force, that is, a point where a line D and a line B intersect in FIG. 8B). Therefore, when the braking operation is released, the balls are configured to be moved even after the ball retainer 133 is stopped, and as a result, it is possible to maintain gaps between the balls and the ball retainer 133.

Figure 9:
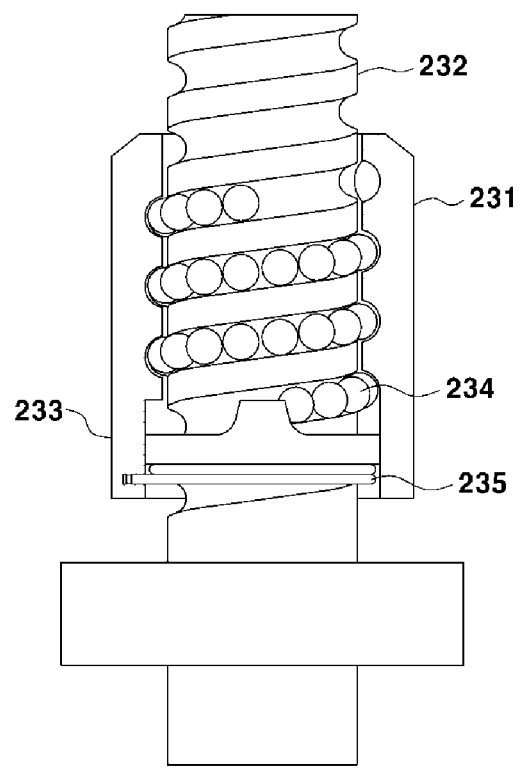
FIG. 9 is a cross-sectional perspective view illustrating a main operating device of an electromechanical brake according to another exemplary embodiment of the present invention.
Figure 10:
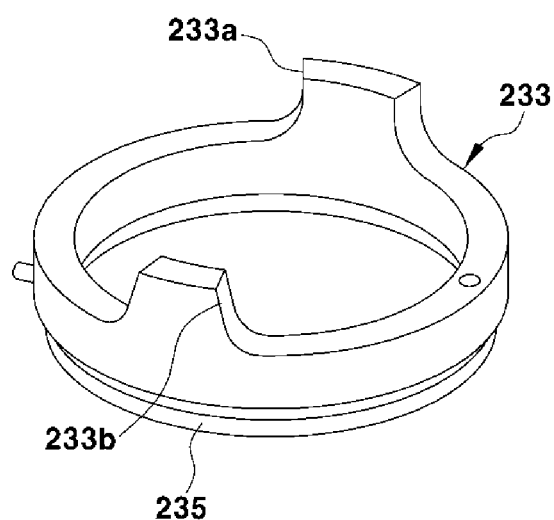
FIG. 10 is a perspective view illustrating a ball retainer of the main operating device illustrated in FIG. 9.

Meanwhile, FIG. 9 is a cross-sectional perspective view illustrating a main operating device of an electromechanical brake according to another exemplary embodiment of the present invention, and FIG. 10 is a perspective view illustrating a ball retainer 233 of the main operating device illustrated in FIG. 9.

The present exemplary embodiment is identical to a previous exemplary embodiment except that the ball retainer 233 has a structure illustrated in FIG. 10. Therefore, like a previous exemplary embodiment, the present exemplary embodiment includes a ball screw structure including a nut member 231, a screw 232, and balls 234. According to the present exemplary embodiment, the ball retainer 233 has at least one protrusion portion 233a having a sidewall having a curved surface instead of a structure having a groove.

That is, as illustrated in FIG. 9 and FIG. 10, the protrusion portion 233a of the ball retainer 233 according to the present exemplary embodiment has a structure that protrudes toward the balls 234 accommodated between the nut member 231 and the screw 232 to contact with the balls. A lateral side of the protrusion portion 233a has a sidewall having a curved surface to move and support the balls, and when the balls apply force to the ball retainer 233, the protrusion portion 233a is configured to transmit the force, and compress the spring member 235 which is a torsion spring. Therefore, the protrusion portion 233a has a curved shape of which the protruding height is decreased leftwards and rightwards from a center. Further, the protrusion portion 233a may be configured to have a predetermined area which is configured to be increased outward from a center of the ball retainer 233 having a ring shape, that is, from an internal surface of the protrusion portion 233a to an external surface of the protrusion portion 233a, and as a result, the protrusion portion 233a may accommodate the balls, and may effectively transmit force from the balls to the spring member without a clearance with the balls. A single protrusion portion may be provided, or a pair of protrusion portions 233a and 233b may be provided as illustrated in FIG. 10.

Because operating mechanisms of the ball retainer and the spring member are substantially identical to the aforementioned operating mechanism, a description thereof will be omitted.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of predetermined exemplary embodiments of the present invention have been presented for purposes of illustration and description. They are not intended to be exhaustive or to limit the invention to the precise forms disclosed, and obviously ma modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electromechanical brake apparatus comprising:
a piston which is configured to press a friction pad; and
a drive device which is configured to provide power for moving the piston,
wherein the drive device includes a nut member which is coupled to the piston and configured to transmit axial movement power to the piston, a screw which is coupled to the nut member and rotates to move the nut member in an axial direction, a plurality of balls which is configured to be inserted between the nut member and the screw and transmits rotational force of the screw to the nut member, a torsion spring having a first side which is mounted to the nut member, and a ball retainer which is mounted at a second side of the torsion spring, and
wherein the ball retainer is disposed to be adjacent to the ball at a rearmost end portion among the balls inserted between the nut member and the screw, and configured to come into contact with the ball and press the torsion spring when braking pressurization is carried out.

2. The electromechanical brake apparatus of claim 1, wherein a head portion, which is formed to press an internal end portion of the piston, is formed at a first end portion of the nut member, and a support groove for accommodating the ball retainer and the torsion spring is formed at a second end portion of the nut member.

3. The electromechanical brake apparatus of claim 2, wherein a support end portion for preventing the ball retainer from moving toward the ball is formed in the support groove.

4. The electromechanical brake apparatus of claim 3, wherein the torsion spring is disposed on the support end portion to be restricted in a compressed state to have initial mounting force.

5. The electromechanical brake apparatus of claim 1, wherein the ball retainer is disposed to have a gap with the ball before the braking pressurization is carried out.

6. The electromechanical brake apparatus of claim 5, wherein the ball retainer forms a gap with the ball even after a braking operation is released.

7. The electromechanical brake apparatus of claim 1, wherein at least one retainer groove is formed in an internal surface of the ball retainer to accommodate the plurality of balls.

8. The electromechanical brake apparatus of claim 7, wherein at least one disconnection portion is formed in the ball retainer so that the retainer groove is not formed over an entire internal surface of the ball retainer.

9. The electromechanical brake apparatus of claim 8, wherein a concave and curved shape is formed as a depth of the groove is increased at an end portion of the retainer groove based on the disconnection portion.

10. The electromechanical brake apparatus of claim 7, wherein the nut member has a guide groove in which the plurality of balls is configured to be moved, and an internal diameter of the retainer groove is equal to an internal diameter of the guide groove.

11. The electromechanical brake apparatus of claim 1, wherein at least one protrusion portion is formed on the ball retainer to prevent the plurality of balls from moving rearwards thereof.

12. The electromechanical brake apparatus of claim 11, wherein the at least one protrusion portion has a curved shape of which a protruding height is decreased leftwards and rightwards from a center of the protrusion portion, and the protrusion portion has a sidewall having a concave and curved shape.

* * * * *